United States Patent
Zakour

(10) Patent No.: US 11,163,906 B2
(45) Date of Patent: Nov. 2, 2021

(54) ADAPTIVE REDACTION AND DATA RELEASABILITY SYSTEMS USING DYNAMIC PARAMETERS AND USER DEFINED RULE SETS

(71) Applicant: Orbis Technologies, Inc., Annapolis, MD (US)

(72) Inventor: Elias Zakour, Severna Park, MD (US)

(73) Assignee: Orbis Technologies, Inc., Annapolis, MD (US)

( * ) Notice: Subject to any disclaimer, the term of this patent is extended or adjusted under 35 U.S.C. 154(b) by 295 days.

(21) Appl. No.: 16/151,694

(22) Filed: Oct. 4, 2018

(65) Prior Publication Data

US 2020/0110902 A1    Apr. 9, 2020

(51) Int. Cl.
G06F 21/00 (2013.01)
G06F 21/62 (2013.01)
G06F 16/22 (2019.01)

(52) U.S. Cl.
CPC .......... G06F 21/6254 (2013.01); G06F 16/22 (2019.01)

(58) Field of Classification Search
CPC .............................. G06F 21/6254; G06F 16/22
See application file for complete search history.

(56) References Cited

U.S. PATENT DOCUMENTS

| | | | | |
|---|---|---|---|---|
| 10,489,370 B1 * | 11/2019 | Pai | ...................... | G06F 16/2272 |
| 2008/0046757 A1 * | 2/2008 | Staddon | .................. | H04L 9/088 |
| | | | | 713/189 |
| 2010/0145917 A1 * | 6/2010 | Bone | ..................... | G06F 16/122 |
| | | | | 707/694 |
| 2010/0180349 A1 * | 7/2010 | Koohgoli | ............ | G06F 16/2358 |
| | | | | 726/30 |
| 2014/0053232 A1 * | 2/2014 | Coles | .................... | G06F 21/604 |
| | | | | 726/1 |
| 2015/0269383 A1 * | 9/2015 | Lang | ....................... | H04L 63/20 |
| | | | | 726/1 |
| 2017/0099344 A1 * | 4/2017 | Hadfield | ............... | G06F 16/182 |
| 2019/0108419 A1 * | 4/2019 | Coven | ................ | H04L 12/1831 |

OTHER PUBLICATIONS

Jensen et al., "Generalized representation and mapping for social-ecological data: Freeing data from the database", 2012 IEEE 8th International Conference on E-Science, Date of Conference: Oct. 8-12, 2012.*

Silva et al., "Discovering Inconsistencies in PubMed Abstracts through Ontology-Based Information Extraction", ACM-BCB '17: Proceedings of the 8th ACM International Conference on Bioinformatics, Computational Biology, and Health Informatics, Aug. 2017, pp. 362-371 (Year: 2017).*

* cited by examiner

*Primary Examiner* — Morshed Mehedi
(74) *Attorney, Agent, or Firm* — Edell, Shapiro & Finnan, LLC

(57) ABSTRACT

Methods, systems and computer program products are provided to automate redaction of data and metadata. Without modification of the underlying source code, a user may modify, add or remove rules and/or templates for governing redaction of data and metadata of source artifacts. Additionally, the system may automatically infer relationships between modified metadata parameters from application updates and normalized metadata parameters. In some cases, the system may add metadata to the redacted work products for compliance or other purposes. Additionally, redacted work products may comprise redacted source artifacts and a list of rules and/or templates applied to the source artifacts during redaction.

23 Claims, 6 Drawing Sheets

ADAPTIVE REDACTION AND DATA RELEASABILITY SYSTEMS USING DYNAMIC PARAMETERS AND USER DEFINED RULE SETS

STATEMENT REGARDING FEDERALLY SPONSORED RESEARCH OR DEVELOPMENT

This invention was made with government support under Contract #W15QKN-14-9-001 awarded by the Department of the Interior. The government has certain rights in the invention.

FIELD OF THE INVENTION

Present invention embodiments relate to redaction tools, and in particular, to adaptive applications that interface with dynamic parameters and user defined rule sets to automate redaction of data and metadata.

BACKGROUND

Organizations or other entities may need to release documents and multimedia artifacts containing confidential or other sensitive information. In such cases, confidential and/or sensitive information may be obscured through a process referred to as redaction. For example, a user may visually identify (e.g., using a graphical user interface) confidential and/or sensitive information, and may perform manual operations (e.g., via a keyboard, mouse, or touchscreen) to select and apply obscuring marks (e.g., using a black line or box, etc.) to hide the selected information.

Depending upon the type of organization and purpose of the information release, specific rules may apply to the release of confidential or sensitive information. Traditionally, the process of redaction is not automated, and users manually perform operations.

Accordingly, redaction tools are often tedious to use, and rely upon manual interactions with a user for processing. User-driven processes are also error prone and may necessitate manual review of the redacted documents prior to release to ensure accuracy. Additionally, information may contain metadata, which is hidden information that may contain sensitive or confidential information. Metadata is often difficult to locate, as its location may vary from application to application, and may change with application updates. Thus, manual redaction is both error prone and subject to inadvertent release of hidden metadata.

SUMMARY

According to the techniques disclosed herein, methods, systems, and computer program products are provided to redact electronic data and metadata in an automated manner. A request to redact electronic data and metadata is received, from a client device. Pre-defined rules and/or templates that govern redaction of the electronic data and metadata are provided to a redaction engine. Metadata parameters are mapped to normalized metadata parameters that are operated on by the redaction engine. The rules and/or templates are applied to the electronic data and normalized metadata parameters to generate, by the redaction engine, a redacted product.

In some aspects, it may be determined that the metadata parameters associated with an application have been modified or updated. Systems, methods and computer program products are provided for inferring identities of the modified metadata parameters, and assigning the modified metadata parameters to the normalized metadata parameters using an adaptive mediation process.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. The invention may take form in various components and arrangements of components, and in various steps and arrangements of steps. The drawings are only for purposes of illustrating preferred embodiments and are not to be construed as limiting the invention. The accompanying drawings, which are incorporated herein and form part of the specification, illustrate various embodiments of the present invention and, together with the description, further serve to explain the principles of various embodiments of the invention and to enable a person skilled in the pertinent art to make and use the various embodiments of the invention. In the drawings, like reference numbers indicate identical or functionally similar elements.

DETAILED DESCRIPTION

Methods, systems, and computer program products are provided to automate the redaction of data and metadata of source artifacts in electronic format. A user may provide redaction rules, through a user interface, that are used to redact data and metadata. In some aspects, a first set of rules may be applied to the source artifacts to redact metadata, and a second set of rules may be applied to the source artifacts to redact non-metadata. In other aspects, rules may be specific to types of source artifacts, such that one set of rules may be applied to image files to redact metadata, and another set of rules may be applied to text-based files to redact metadata, and so forth. The rules may be modified by a user, without modification of the underlying source code, through the user interface. Additionally, the methods, systems, and computer program products may automatically detect modifications in metadata parameter labels. The identity of the modified metadata parameter label may be inferred, allowing the modified metadata parameter to be mapped to a normalized parameter, which is subject to redaction rules. In some aspects, redacted data and metadata is compressed as compared to the corresponding source artifact. These processes not only allow automated redaction of data across a variety of formats with high fidelity, but also improve processing capabilities of the redaction and data releasability system in terms of performance and ability to redact large sets of data. A validation mechanism is implemented by the validation engine 54, to ensure data integrity and validity after initial redaction is performed. This helps ensure that data and metadata being produced conform to the defined rules.

Figure 1:
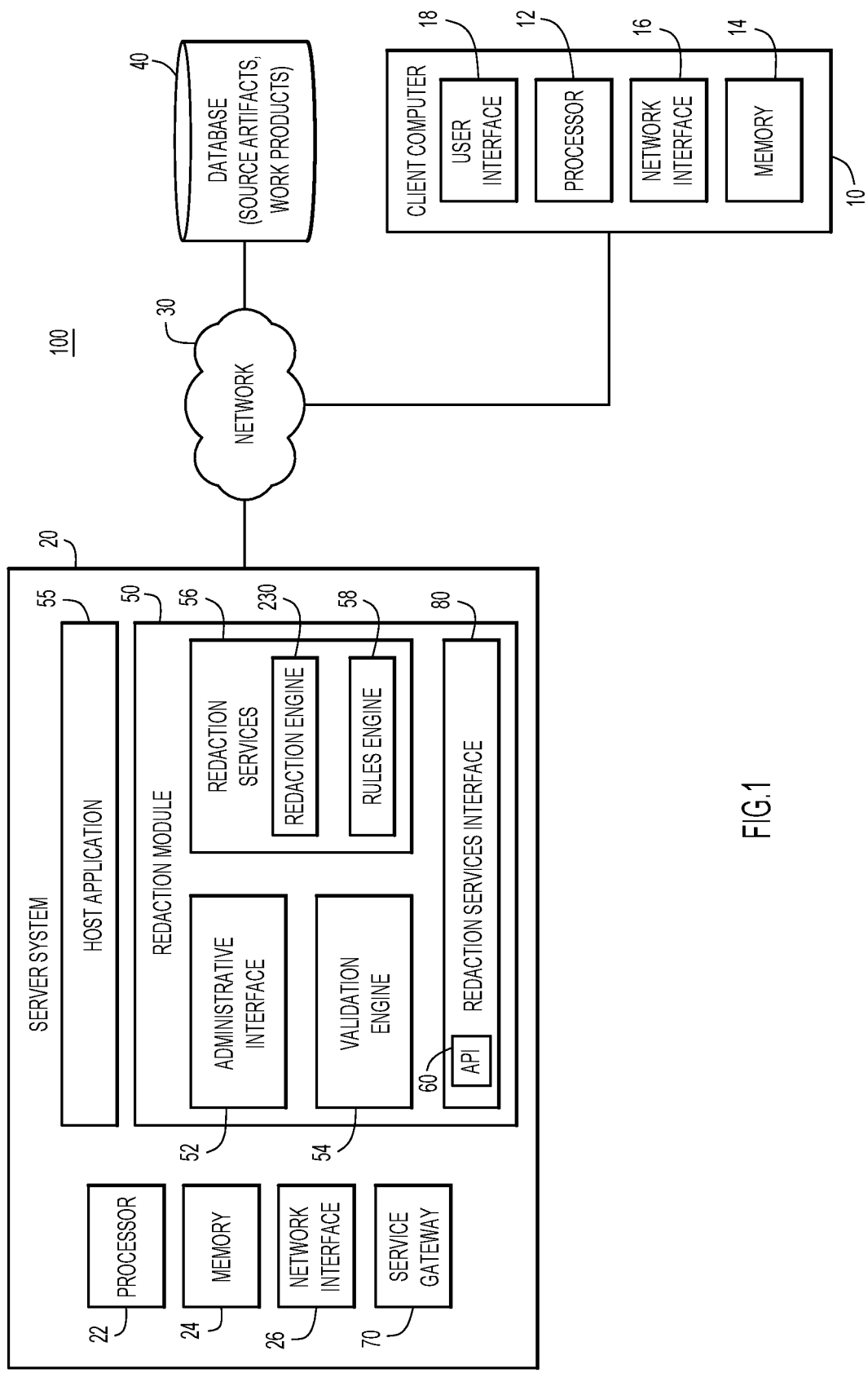
FIG. 1 is a block diagram illustrating an example computing environment in which a redaction and data releasability system may be implemented, according to embodiments.

With reference now to FIG. 1, a block diagram is shown of an example computing environment 100 in which aspects of the embodiments provided herein may be implemented. The computing environment 100 may include at least one end-user or client computer 10 and at least one server system 20. Client computer 10 and server system 20 may communicate over a network 30. Server system 20 may also communicate with remote databases 40, which may store data prior to and after redaction as well as redaction rules and templates. Database 40 may contain source artifacts stored in electronic format wherein the source artifacts may include but are not limited to files stored in electronic format in a file repository (e.g., images, documents, audio recordings, video, etc.) as well as files stored in a database or email system. Thus, text in structured or unstructured format as well as electronic information stored in files may be redacted. Database 40 may be a relational database or a non-relational database or a hybrid thereof. Relational databases may include Microsoft SQL Server, Oracle Database, MySQL, and IBM DB2, while non-relational databases may include MongoDB, DocumentDB, Cassandra, Coachbase, HBase, Redis, Neo4j, etc.

Although a single database is shown, it is understood that the server may communicate with any number of databases or other sources of data having data to be redacted. In an example embodiment, server system 20 may be configured to implement a redaction and data releasability system to automate redaction of data and metadata, including text, images, and/or video, from source artifacts stored in electronic format.

In the example embodiment shown in FIG. 1, server system 20 includes one or more processors 22 (e.g., a CPU, a GPU, a microprocessor, a microcontroller, a controller, etc.), a memory 24 (e.g., RAM, ROM, EPROM, flash, etc.), a network interface 26 (e.g., modem, network card, etc.), a redaction module 50, a service gateway 70, and a redaction services interface 80. The redaction module 50, service gateway 70, and redaction services interface 80 may be stored in memory 24 or some other non-transitory computer readable medium. In this embodiment, redaction module 50, service gateway 70, and redaction services interface 80 are shown on a single server system 20. However, it is understood that these components may be distributed across a plurality of servers or other computing devices.

Redaction module 50 may integrate with other applications, such as host application 55. Accordingly, in some aspects, the redaction capabilities of redaction module 50 may be accessible through the host application. In other aspects, redaction module 50 may be a stand-alone application, though which a user may access data and metadata to perform redaction.

Administrative interface 52 provides an interface for an administrator to approve or reject changes to predefined rules and/or templates. In some cases, rule changes may be made by a user, and these changes may be logged for subsequent approval by an administrator. Once approved, the rule changes are applied in a global, forward manner. This process helps ensure that rules and/or templates are not unintentionally modified. Using this interface, an administrator or other user may also review redacted work products and other associated documents.

Validation engine 54 may allow a user or administrator to verify redaction workflows as well as the corresponding rules and/or templates applied during the workflow.

Host application 55 may include any suitable application, including but not limited to applications for accessing or modifying images, video, or other documents such as MS Word, PowerPoint, PDF, etc. In some aspects, the host application may be an image analysis tool, such as an image exploitation tool that may analyze and process images. Image exploitation tools may perform object recognition on images, motion tracking on objects, as well as other types of image analysis. In some embodiments, the image exploitation tool may identify objects for redaction by the redaction and data releasability system. In this example, a user may generate a rule or apply a template to recognize the object, and the object may be redacted. Further, a user may generate a rule or apply a template to redact metadata associated with the image.

Application Programming Interface (API) 60 may provide a standardized interface for components of the redaction and data releasability system to communicate with other applications. In some aspects, redaction services interface 80 may include API 60, although other configurations of API 60 within server system 20 or redaction module 50 are possible. In some aspects, the APIs may utilize standard protocols allowing rapid application development, compatibility and deployment. In some aspects, a user may initiate a program call using an API, wherein the API sends and receives parameters, rules, templates/data models, or other information to and from the redaction module.

In some aspects, a user may access API 60 through user interface 18. Through the API, the user may dynamically configure rule changes, make template modifications, etc. Once rule changes or template modifications are made, these changes persist and become part of the automated redaction process in a global, forward manner.

Service gateway 70 may act as a conduit to facilitate communication between different components of the redaction and data releasability system. For example, the service gateway 70 may route data, metadata, work products, and other information between API 60, redaction module 50, host application 55, and redaction services interface 80. In some aspects, service gateway 70 may also utilize services to secure data and metadata during transmission. Additionally, when the components of the redaction and data releasability system are distributed over a plurality of computing systems, the service gateway may interact with load balancers to distribute processing loads over the system infrastructure. By using the service gateway and redaction service interface, templates and/or rules may be developed once and used for subsequent redaction service requests. The service gateway may also mediate requests for multiple redaction services from multiple consumers.

Redaction services interface 80 may comprise a programmatic interface for configuring templates and/or rules associated with the redaction and data releasability system. Redaction services interface 80 may enable a user to configure independently of a platform or programming language, operations for implementation of the redaction and data releasability system, with these operations governed by rules and/or templates, and executed at later points in time.

Server system 20 may include any number of computer processors or central processing units (CPUs) or graphical processing units (GPUs), any number of which may include one or more processing cores. In some embodiments, any of the processing cores may be physical or logical. For example, a single core may be used to implement multiple logical cores using symmetric multi-threading.

In other embodiments, the redaction and data releasability system may utilize virtual machines. In still other aspects, the redaction and data releasability system may operate in any suitable environment, including but not limited to Windows, Linux, Unix, etc.

Client computer 10 may be a personal computer, a network computer, a tablet, a smartphone, or any computing device configured to communicate with server system 20, and may be equipped with a display (e.g., a monitor, a touch screen, a LCD screen, or any physical or virtual interface to display content, etc.) for viewing information (e.g., redacted documents, templates, rules, work products, etc.) as well as keyboards, mice, keypads, touch screens, or voice capture devices etc., for selecting data for redaction. Client computer 10 may also comprise commercially available software for operation of the computer (e.g., an operating system, updates, drivers, etc.) as well as server/communications software, browser/interface software for accessing data, etc. Client computer 10 includes one or more processors 12 (e.g., a CPU, a GPU, a microprocessor, a microcontroller, a controller, etc.), a memory 14 (e.g., RAM, ROM, EPROM, flash, etc.), a network interface 16 (e.g., network card, serial interface, etc.), and a user interface 18. User interface 18 may be configured to display the redacted work product, rules and/or templates along with other information associated with the redaction process. Additionally, user interface 18 may also be configured to communicate with server system 20, to allow the user to configure various rules and/or templates as well as select specific sets of electronic information for redaction. Thus, user interface 18 may be a graphical user interface (e.g., a GUI, a command line prompt, a menu screen, etc.) that prompts a user for information pertaining to the redaction, and may provide reports or other information pertaining to the results of the redaction, e.g., rules, templates, work products, etc. Client computer 10 may be configured to communicate with server system 20 via a web browser (e.g., by accessing a website hosted by a server), via a web browser plug-in, or via an application program running on the client computer.

Redaction services 56 utilizes rules and/or templates to perform redaction of text, images and video and associated metadata in a source artifact in an automated manner, as described below. Users may define rules and/or templates which are managed by rules engine 58. Redaction engine 230 applies the rules from rules engine 58 to redact source artifacts, as described below and with reference to FIG. 2.

In some embodiments, images, text, and video, along with corresponding metadata may be redacted from the source artifacts using the present techniques. For video, the video may be decomposed into a series of frames/images, and each frame may be redacted based on the pre-defined rules and/or templates. In other aspects, voice-to-text translators may be used to translate audio to text, and redaction module 50 may be used to redact the translated text.

Server system 20 may be connected to datastore/database 40, which may store various types of information for the redaction of electronic documents, including custom templates, rules, products of workflows, and source artifacts. In some cases, the modules of server system 20, such as redaction module 50 and/or host application 55 may send or retrieve information to database 40 via service gateway 70. The database may be implemented by any conventional database unit or storage unit, or equivalent, may be local to or remote from the server 20, and may communicate with the server system 20 through any suitable medium (e.g., wire, cable, wireless, LAN, WAN, Internet, Intranet, VPN, etc.). In some aspects, the database may store data in any suitable format, including but not limited to postgreSQL, or any other format compatible with SQL databases or other databases.

Client computer 10 may be connected to server system 20 via any suitable communication network 30 including e.g., the Internet, the Intranet, a wide area network (WAN), a local area network (LAN), a wireless link, hardwire, a VPN or a modem. Client computer 10 and server system 20 may be local to or remote from each other. Networks include but are not limited to wired communication links, wireless communication links, fiber optic communication links, etc.

Server system 20 may access database 40 via any suitable communication network, including e.g., the Internet, the Intranet, a wide area network (WAN), a local area network (LAN), a wireless link, hardwire, a VPN, etc. Networks include but are not limited to wired communication links, wireless communication links, fiber optic communication links, etc. Database 40 may be attached to the network, e.g., network attached storage, cloud based data storage system, or other remote storage.

In some embodiments, the redaction and data releasability system may be configured to operate as a standalone unit on a client computer, such that the client computer 10 has access to database 40 and redaction module 50, a host application 55 (if needed) as well as redaction services interface 80. The standalone unit may perform automated redaction of data and metadata, according to the techniques described herein.

Thus, the server may provide customizable automated redaction services, including redaction of data and metadata along with work product generation. In some cases, an original source artifact may be redacted and stored separately from the original source artifact. In other cases, original source artifacts may be redacted and embedded in another document (e.g., the redacted source artifacts may be embedded into a single document to produce a work product). The rules and/or templates used for redaction may also be embedded into the same document (e.g., same work product).

The client device 10 allows a user to access the redaction services interface to configure rules and/or templates to redact and release documents to particular entities, as well as for receiving requests to redact data and metadata based on particular sets of rules and consumers.

Figure 2:
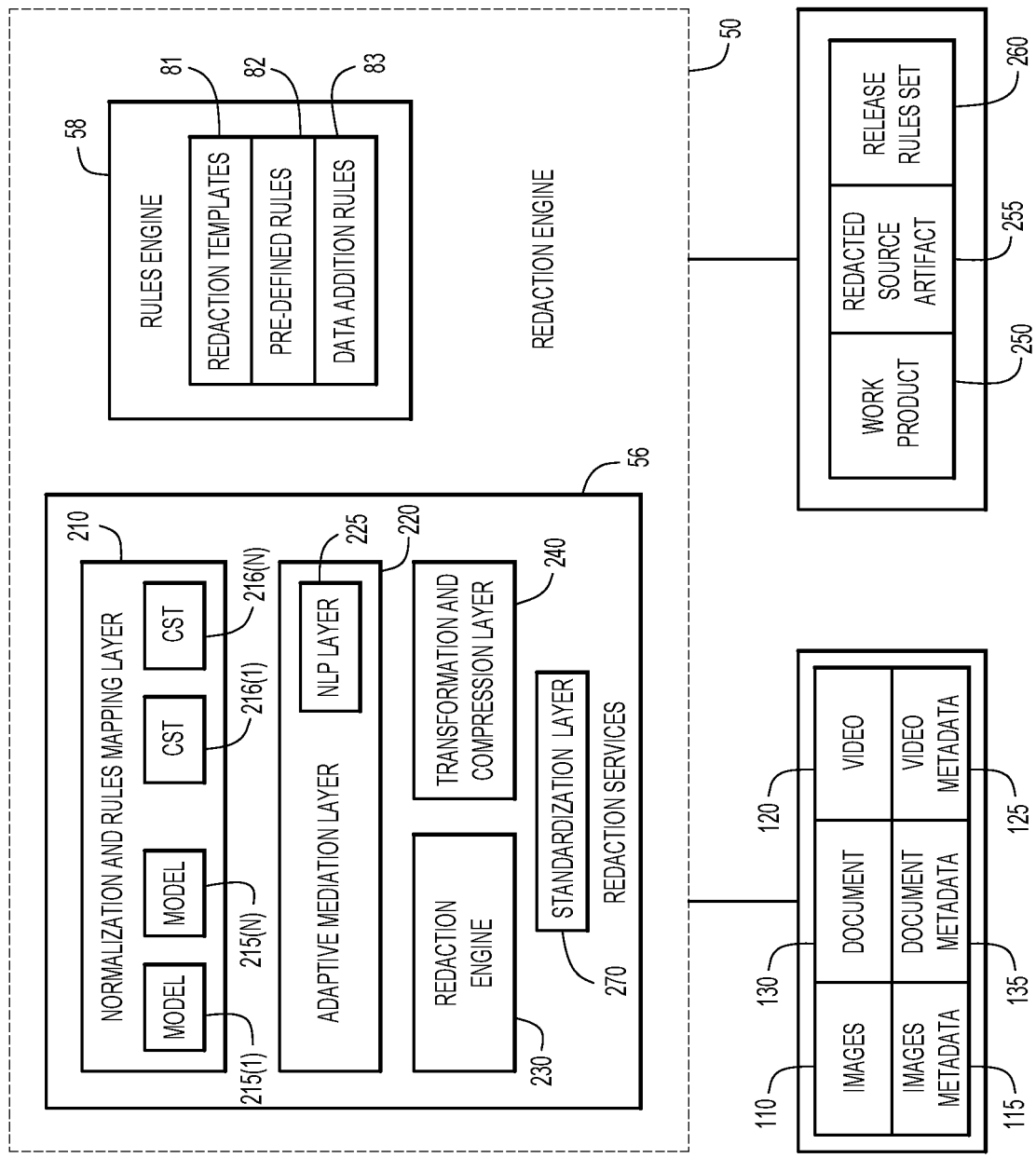
FIG. 2 is a block diagram illustrating aspects of an example redaction engine and associated data layers of a redaction and data releasability system, according to embodiments.

FIG. 2 is an illustration of aspects of a redaction process including data layers for redaction services 56. Redaction services 56 may comprise a normalization and rules mapping layer 210 including a plurality of data models 215(1)-215(N), an adaptive mediation layer 220 that may comprise a natural language processing (NLP) layer 225, a redaction engine 230, a transformation and compression layer 240, and a standardization layer 270. In some aspects, redaction services 56 may interface with the host application 55 to redact data and associated metadata. In other aspects, redaction services 56 may be a stand-alone application that redacts data and associated metadata. Additionally, standardization layer 270 may help normalize data and associated metadata comprising the product, both pre and post processing.

Normalization and rules mapping layer 210 may map metadata parameters to normalized parameters. Normalized parameters are parameters that the system is configured to associate with rules from rules engine 58. For example, a metadata parameter corresponding to a JPEG image acquisition date may be mapped to a normalized parameter corresponding to an image acquisition date. A different metadata parameter corresponding to a NITF image acquisition date may be mapped to the same normalized parameter corresponding to the image acquisition date. In this example, when the system applies a rule to redact the image acquisition date, the system applies this rule to both types of images even though the metadata parameter corresponding to the image acquisition date may be different in each image file type. Additionally, by mapping metadata parameters to normalized parameters, the system may automatically identify unmapped parameters, and if unable to resolve, may notify the user. These techniques allow redaction to proceed in a uniform and consistent manner. Similarly, if an acquisition date is constituted in the rules engine, and not found during processing, the user will be notified to provide input.

In general, parameters may include metadata fields, labels, headers, or other identifiers used to identify specific types of electronic information. The normalized parameters may be subject to rules associated with the rules engine 58 that govern redaction (e.g., redaction templates 81, pre-defined rules 82, data addition rules 83, etc.). In some aspects, normalization and rules mapping layer 210 may be configured to redact data for release to different entities, and accordingly, may contain different redaction models 215(1)-215(N), wherein each model is configured to redact data based on corresponding entity requirements. Accordingly, redaction templates 81, pre-defined rules 82, and data addition rules 83 may be linked to a particular model, to facilitate automation of redaction flows that generate different work products with different information that is redacted.

In some aspects, custom software translators CST 216(1)-216(N) may be used to map data and metadata to normalized parameters. For example, a CST capable of understanding a layered PowerPoint presentation may be constructed such that the translator comprises an XML schema for PowerPoint, wherein the schema interprets data and metadata parameters of the layered PowerPoint presentation. In some aspects, the system may assign a parameter and a corresponding parameter value to an annotation, which will persist for rules engine 58. The rules engine 58 interprets this annotation and retains this information for future redaction purposes. As an example, for a JPEG2000 file, the rules engine may retain the location of annotations (e.g., where metadata parameters are located within the image.raw format for JPEG2000), and may retain this information for future use. In some aspects, the normalization and mapping layer may access metadata in binary documents (e.g., images, etc.), by extracting metadata and storing this data in XML format for subsequent processing.

Rules engine 58 comprises rules and templates that govern redaction (e.g., redaction templates 81, predefined rules 82, data addition rules 83, etc.). A user may add, modify, or delete rules and/or templates to customize particular information to redact, using the redaction services interface 80. The rules from rules engine 58 are provided to the redaction engine, in some cases, via the redaction services interface 80, which may apply the rules and/or templates to the corpus of source artifacts to generate redacted documents.

In some aspects, the rules engine may comprise rules to redact electronic information associated with blacklisted terms (e.g., confidential, sensitive, secret, top secret, classified, privileged, etc.), or rules to not redact electronic information associated with whitelisted terms (e.g., public, unclassified, etc.).

Rules may be in any suitable format (e.g., XML, etc.) and may conform to suitable schema. Documents and/or metadata may be converted to any suitable format (e.g., JSON, XML, etc.) for processing.

Different rules and/or templates sets may lead to different redacted products, each having a certain form. Thus, the redaction services rely on these rules, from rules engine 58, to generate work products and/or redacted source artifacts. In some cases, an original source artifact may be redacted and stored separately as a redacted source artifact. In other cases, original source artifacts may be redacted and embedded into a document to generate a work product (e.g., all redacted images may be embedded in a word processing file, along with specific rules from the rules engine used for the redaction, for ease of review). The system may access rules and/or templates as needed (e.g., on demand, by calling an API or restful API, etc.). By configuring the data redaction and releasability system to provide access to the rules engine via an API, a user may change redaction schemes without extensive modification or reprogramming of the underlying source code. When a redaction is performed, the rules engine provides the latest set of rules, including rules changes, to the redaction engine to provide dynamic redaction processes.

In general, redaction templates 81 may include sets of pre-defined rules 82. In some aspects, pre-defined rules 82 may include user entered rules, or customized rules that direct redaction of a particular type of information. For example, a template may contain a list of parameters, with instructions for particular parameters to be redacted in particular manners. Data addition rules 83 may comprise rules to add information to a document (e.g. a date, an author's name, etc.). In some cases, data addition rules may add missing metadata, if such metadata is known, to electronic information, in order to standardize metadata across a corpus of documents. In other cases, for compliance purposes, user names and dates may be added to images of redacted documents.

In some cases, the fields or parameters associated with source artifacts may change over time. Adaptive mediation layer 220 may compensate for such changes in an automated manner. For example, if the metadata parameters change (e.g., due to new releases, etc.) for image, document, and video files, the adaptive mediation layer may detect such changes, and may automatically map the updated parameters to the appropriate normalized parameter, which is recognized by the redaction and data releasability system. In cases in which the metadata parameter cannot be resolved (e.g., a metadata parameter that cannot be identified, or a new metadata parameter with no known equivalent etc.), a notification may be sent to the administrator or user regarding the unmatched parameter.

Modified parameter names may be recognized in any suitable manner. In some cases, the system may determine that at least one metadata parameter has been modified for a given type of source artifact. For example, when the system determines that a metadata parameter that was previously mapped to a corresponding normalized parameter is no longer mapped to this normalized metadata parameter, the system may determine that the application producing the source artifact has undergone an update, resulting in modification of the metadata parameter.

Modified parameter values may also be recognized in any suitable manner. For example, in some cases, adaptive mediation layer 220 may recognize the value of the parameter, and may infer the identity of the modified parameter based on the value. Once identified, the modified parameter may be mapped to a normalized parameter. In particular, if the parameter is a date, a location, or a (known) name, then the adaptive mediation layer may infer, based on the style or the content of the modified parameter, the normalized parameter that the modified parameter should be mapped to. In other cases, the adaptive mediation layer may determine that the modified parameter name comprises the former parameter name. For example, the former parameter name may be appended with additional text, and the adaptive mediation layer may infer the identity of the modified parameter, and map it to the corresponding normalized parameter. In other cases, the adaptive mediation layer may determine that the modified parameter name is similar to an unmatched normalized parameter name (e.g., using a natural language processing layer (NLP) 225), and may map it to the corresponding normalized parameter.

For example, the identity of the modified metadata parameter may be inferred based on similarity to an unmatched normalized parameter or based on the value of the modified metadata parameter. In some aspects, the modified metadata parameter may have a similar name as an unmatched normalized parameter (e.g., which was previously matched). In other aspects, the value of the modified metadata parameter may be recognized by the system (e.g., a name, a location, a date, etc. may be recognized by the system). By inferring identities of unmatched parameters, and automating matching of the unmatched parameters to normalized parameters, the system may automate redaction processes when metadata parameters change.

In some aspects, NLP layer 225 may extract information from metadata to infer identities of the metadata relative to normalized parameters. In general, NLP layer 225 may be configured to identify and extract metadata parameters and values and/or characteristics thereof, such as identifying and recognizing various formats for dates (e.g., "month day, year", "YYYY-MM-DD" or "YYYY-DD-MM"), etc.), name, or any other feature to be redacted. For example, if the format for a date changes, then the NLP may be configured to detect the new date format. Alternatively, for the name of an individual, the NLP may be configured to detect variants of an individual name. The variants may be flagged for user review. NLP programs may be configured based upon observation-based heuristic rules or machine learning techniques that utilize statistical models to classify data to identify metadata parameters and values.

In some cases, machine learning techniques may be used to infer identities of the metadata. A training data set may be provided to train the machine learning system to classify a new or modified metadata parameter into a category corresponding to a normalized parameter. For example, a metadata parameter corresponding to a date may undergo a modification, due to a new software release. The machine learning system may be trained to recognize various date formats, allowing the machine learning system to classify the modified parameter into a corresponding date category of a normalized parameter.

Thus, metadata parameters may dynamically change, and the adaptive mediation layer may infer the identity of the modified metadata parameters and map these modified parameters to the corresponding normalized parameters. The adaptive mediation layer may utilize value—parameter relationships, or similarity to infer identity. Additionally, the adaptive mediation layer may infer identity based on the order of parameters (e.g., in the header, in the metadata, etc.). For example, if a header or other ordered listing contains one or more mapped metadata parameters before an unmatched metadata parameter and one or more mapped metadata parameters after the same unmatched metadata parameter, then the adaptive mediation layer may infer the identity of the parameter based on the order. Thus, the redaction and data releasability system not only provides the ability to automate redaction processes, but also, automatically infers the identity of unmapped parameters to automate mappings when metadata parameter changes occur.

Redaction engine 230, for a corpus of source artifacts, may apply a set of redaction rules from rules engine 58 to redact certain information. In some cases, specialized templates may be applied, directing the redaction of certain information. For example, a specialized template built on a set of pre-defined rules entered by a user, may redact specific key words, phrases, objects associated with embedded images, and corresponding metadata from source artifacts stored in electronic format (e.g., images 110, images metadata 115, video 120, video metadata 125, documents 130, documents, metadata 135), including but not limited to, names, locations, titles, personally identifying information, dates, phrases, objects associated with an image or with frames of a video (e.g., buildings, machines, faces, etc.) and so forth.

Transformation and compression layer 240 may be used to compress data files (e.g., text, image, video, etc.) during redaction, allowing for an increase in computational efficiency, and utilizing fewer computing resources in term of processing bandwidth and memory usage.

Outputs from redaction services may include a redacted work product 250, which may be customer specific and comprise one or more redacted source artifacts embedded in another document (for ease of presentation), along with release rules set 260, which comprises a listing of the rules used to produce the redacted documents. Outputs from redaction services may also include redacted source artifacts 255, which may also be customer specific and stored individually as redacted source artifacts.

Figure 3:
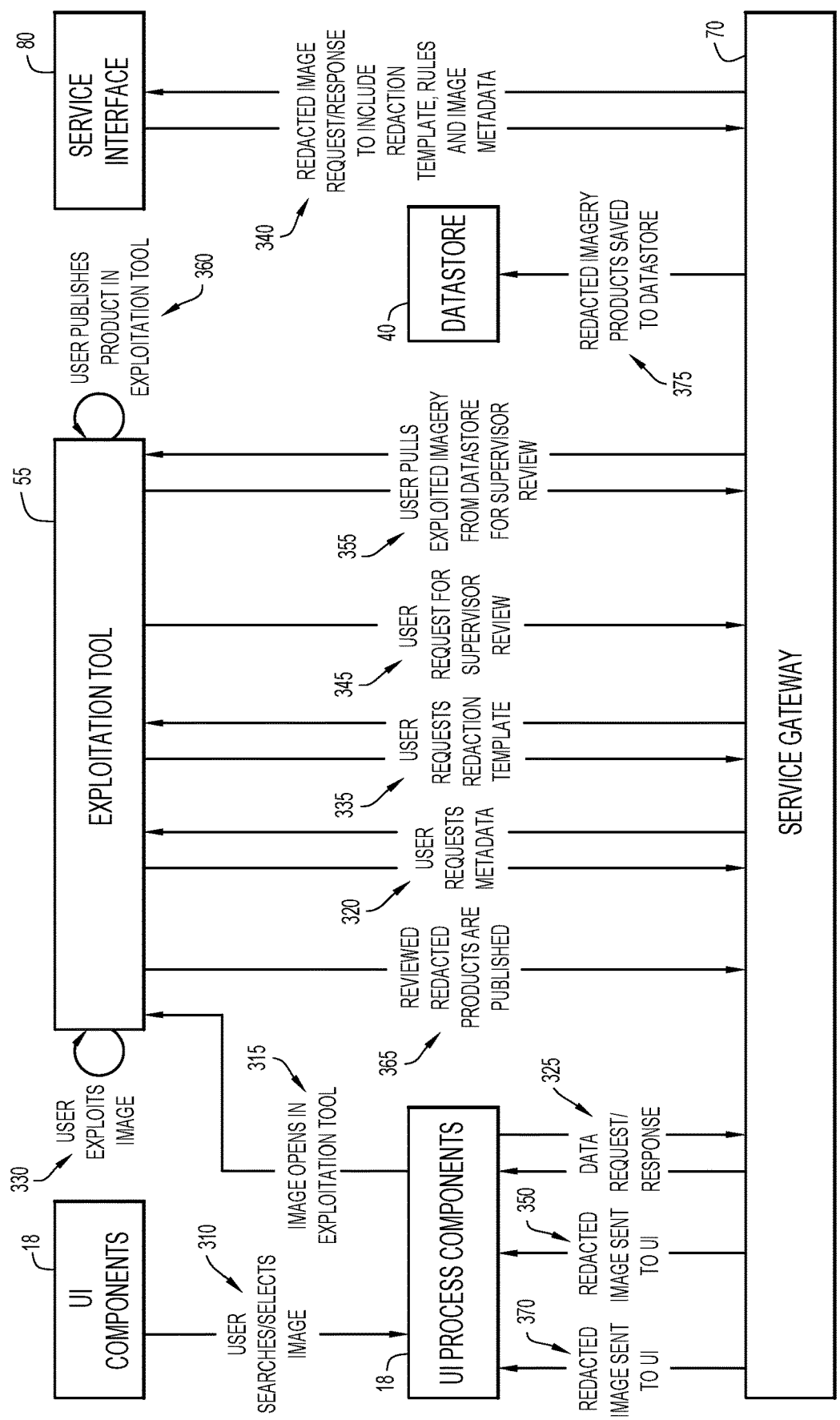
FIG. 3 is a dataflow diagram illustrating aspects of a redaction and data releasability system, according to embodiments.

FIG. 3 is an illustration of an example design and data flow process of the redaction and data releasability system provided herein. The redaction and data releasability system may interface with other systems, such as a host application or image exploitation tool, databases, and various service interfaces and gateways. Examples of host applications may include but are not limited to systems used for image analysis, enterprise publishing systems, and document management systems.

In some aspects, the redaction and data releasability system may be adapted to intercept communications (e.g., email communications with attachments) to an external addressee (e.g., to another domain) and may automatically determine whether the communication and/or attachment should be redacted using pre-defined rules and templates. In some aspects, when the system detects an outgoing email with an attachment that is directed to a particular customer or domain, the system may automatically redact the communication or attachment and replace the original attachment with the redacted version before it is sent. A message may optionally be sent to the sender of the email prior to redaction providing the sender with control over whether the email is redacted.

In some aspects, the redaction and data releasability system may be accessed through a drop down menu of the host application. These techniques provide for improved redaction processes, both from a consistency and accuracy standpoint to ensure that all appropriate data and metadata are redacted, as well as provide processing improvements by accelerating redaction processes (e.g., through production of compressed, redacted files). The following series of example operations apply to images, but may apply to text, video and other file types as well.

At operation 310, a user may select an image by browsing a file system using a user interface to access the redaction and data releasability system. Once the image is selected, at operation 315, the image may open within a host application (e.g., an image exploitation tool). Once the image is opened within the host application, the user may request metadata associated with the image. Image metadata may include metadata parameters such as name, date of image acquisition, time of image acquisition, image modification date, image size, image location, device used to acquire the image, etc. At operation 325, the redaction and data releasability system (e.g., redaction services 56) may receive the request for metadata and may return the requested information via service gateway 70. In some cases, the system may return a portion of metadata associated with the image. In other aspects, the system may return all available metadata associated with the image. In some cases, the system may return key value pairs, which may correspond to the parameter and corresponding parameter value.

In some cases, metadata may be specific to an application (e.g., Word, text, PowerPoint, Excel, pdf, XML, image, etc.) or file type (e.g., jpeg, pdf, txt, doc, ppt, nitf, gif, etc.), and the keys or parameter identifiers associated with the metadata may change as new releases of the application become available. According to aspects, the redaction and data releasability system may automatically infer the identity of updated metadata parameters, and may map the updated metadata parameters to normalized metadata parameters recognized by the redaction and data releasability system, in order to produce to desired work product. In cases in which the updated metadata parameter is not able to be identified, the system may send a notification to the user regarding the unmatched parameter.

At operation 330, a user may perform operations (e.g., exploiting an image which may include but is not limited to pattern recognition operations to identify objects, tracking object movement, etc.) or other analysis on an image or other selected file (e.g., using the host application). At operation 335, the user requests a redaction template (e.g., from the rules engine via the service gateway 70 and service interface 80). The template may be associated with redaction rules and processes for performing a redaction. If a redaction template is not available or an existing template needs to be modified, a user may create/modify the redaction template. This process may involve modifying, removing, or adding redaction rules to a template.

At operation 340, the redaction template, rules and metadata may be obtained from the redaction and data releasability system (e.g., from the rules engine via the service interface and service gateway). The image (or other file type as applicable) may be redacted in an automated manner using the template and rules (e.g., using the host application 55, in this case, the exploitation tool).

At operation 345, the user may send a request for supervisory review. At operations 350-355, the redacted image may be provided for review by a supervisor through the service gateway. The supervisor may review, via the administrative interface 52, modifications, removals, or additions to redaction rules, templates, workflows, and redacted products. In some aspects, changes to redaction rules and/or templates may be approved by a supervisor, before being incorporated into current or future workflows. Operations 345, 350, and 355 may be skipped, if supervisory review is not needed.

Once approved, at operation 360, the user may publish the redacted product using the host application. At operation 365, the redacted products are published and provided to the service gateway, where the products are sent to the graphical user interface, at operation 370. At operation 375, the redacted work products or redacted source artifacts may be stored in a database or file server for subsequent access by the redaction and data releasability system or other systems.

Figure 4:
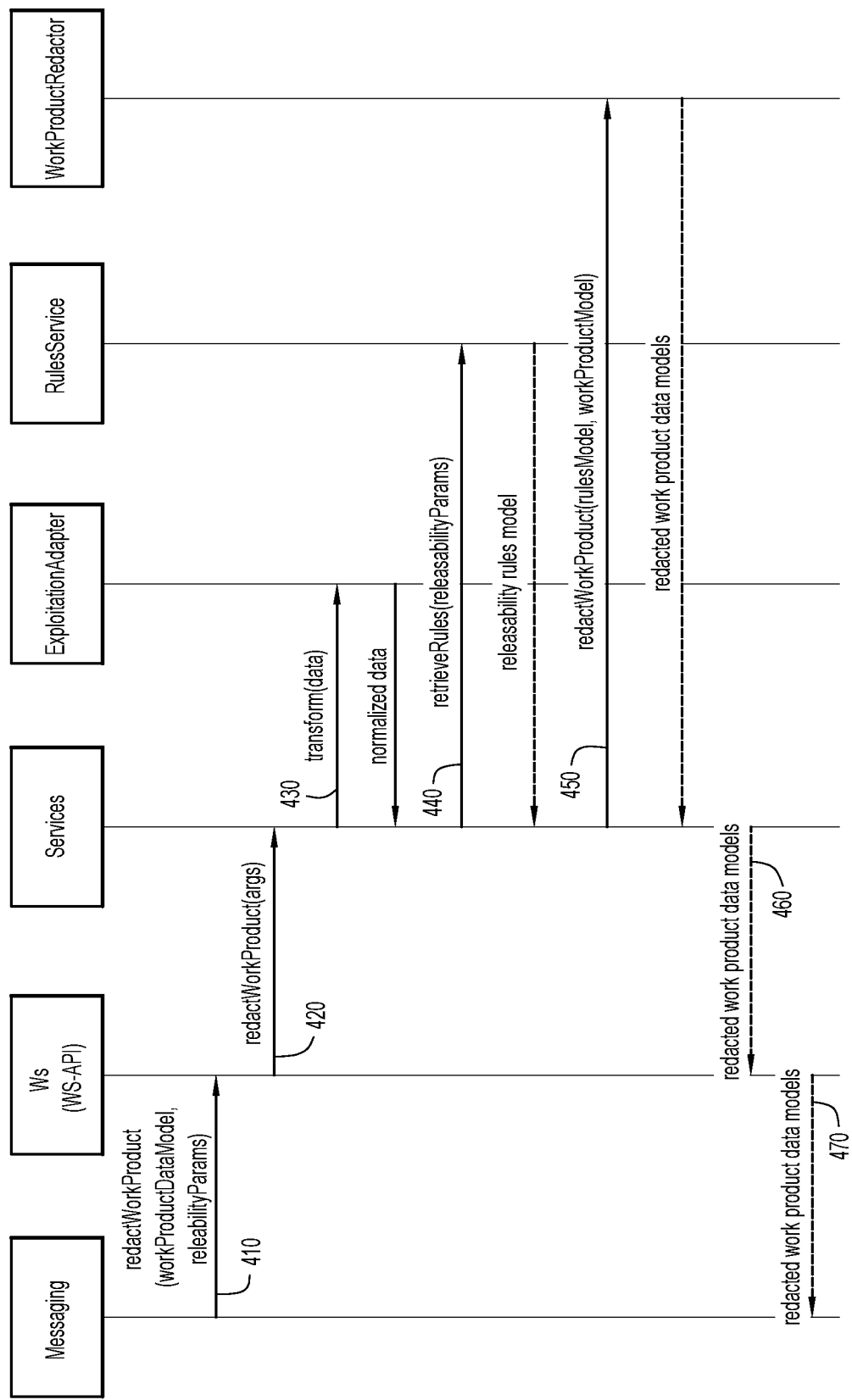
FIG. 4 is a sequence diagram illustrating an example work product sequence, according to embodiments.

FIG. 4 is a redaction sequence flow diagram for a work product. Work products may include redacted source artifacts (e.g., images, text, video, etc.), which may be embedded in a single file. At operation 410, a work product data model corresponding to the image to be redacted and reliability parameters may be provided to a web services application programming interface (e.g., WS-API, or API 60). In some embodiments, the WS-API interface is a RESTful API that may use HTTP requests to send and retrieve data. RESTful APIs, which are based on representational state transfer technology, may be used to send data and metadata to the redaction and data releasability system and to receive redacted data and metadata from the redaction and data releasability system. At operation 420, the WS-API may send the work product data model and reliability parameters to redaction services 56 of the redaction and data releasability system. The reliability parameters may include parameters relating to integrity of the file. At operation 430, the work product data model and reliability parameters may be provided to the normalization and rules mapping layer 210 (e.g., of redaction module 50 that may be accessible through host application 55), where these parameters are transformed or mapped to normalized parameters. Although not shown in the sequence diagram, if a modified parameter is detected the parameters may be provided to adaptive mediation layer 220 of the redaction module for resolution. If the identity of the modified parameter cannot be inferred and automatically mapped to a normalized parameter, a notification may be sent to the user. Different protocols transport methods may be used as well, including but not limited to SOAP based protocols.

At operation 440, redaction services may send a request to the rules service, which is associated with the rules engine 58. The rules service returns a template (e.g., a releasability rules model), which may be used to guide redaction by the redaction engine 230. At operation 450, redaction services sends the redaction template (e.g., rules model) along with a work product model, to the redaction engine. The redaction engine returns a redacted product, the redacted work product data model. At operation 460, the redacted work product data model may be returned to the API, and at operation 470, the redacted work product data model may be returned to the user interface.

Figure 5:
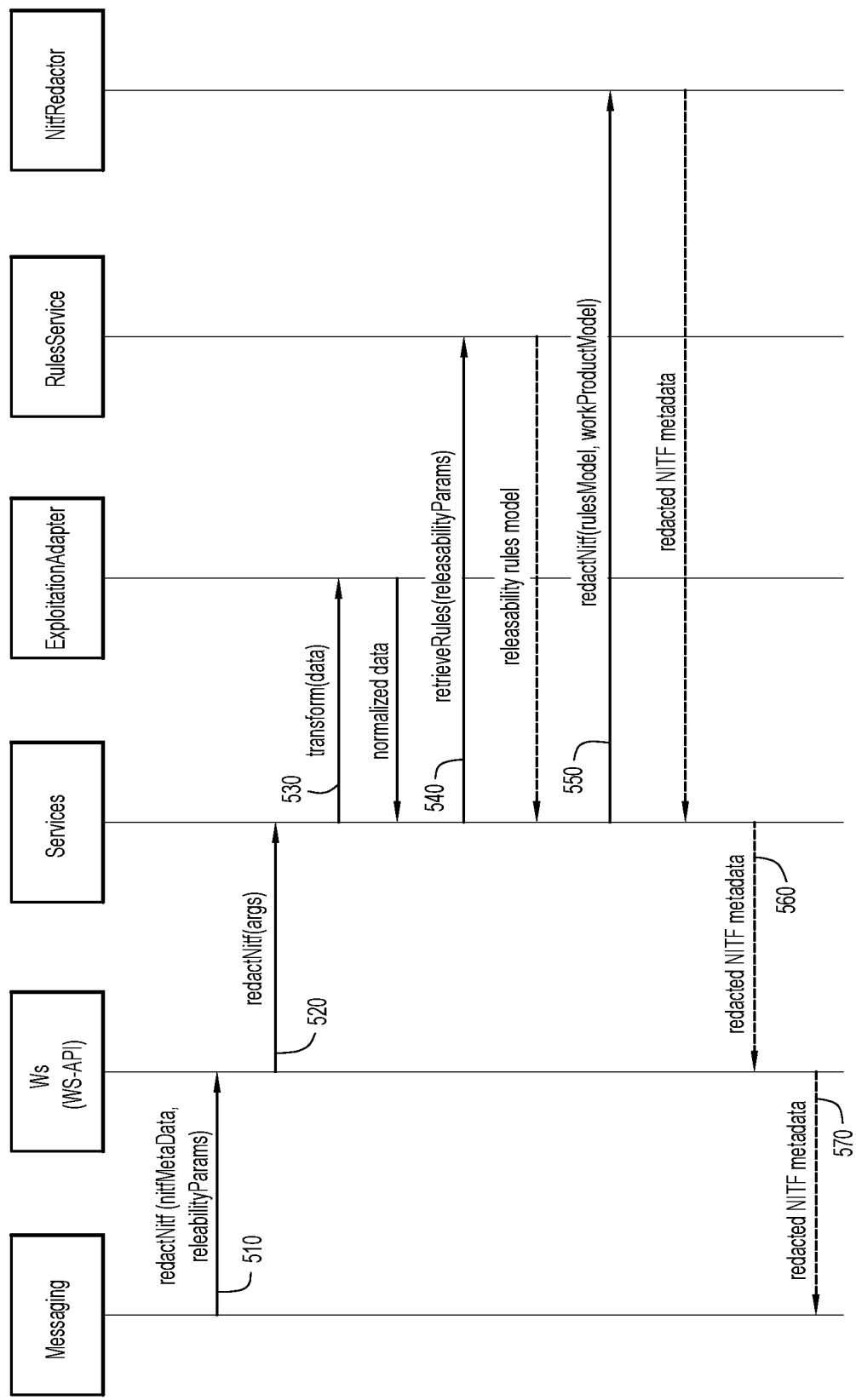
FIG. 5 is a sequence diagram illustrating an example redaction sequence for metadata, according to embodiments.

FIG. 5 is a redaction sequence flow diagram for redacting metadata. A similar workflow may be employed for metadata associated with text or with video. At operation 510, image metadata and reliability parameters corresponding to the image are provided to a web services application programming interface (e.g., WS-API or API 60). In some embodiments, the WS-API interface is a RESTful API that may use HTTP requests to send and retrieve data. At operation 520, WS-API may send the image metadata and reliability parameters to redaction services 56. At operation 530, the image metadata and reliability parameters may be provided to redaction module 50, where these parameters are transformed or mapped to normalized parameters. Although not shown in the sequence diagram, if a modified metadata parameter is detected, the modified metadata parameters may be provided to adaptive mediation layer 220 for resolution. If the identity of the modified parameter cannot be inferred and automatically mapped to a normalized parameter, a notification may be sent to the user.

At operation 540, redaction services may send a request to the rules engine 58 to retrieve releasability parameters. The rules engine may return a template (e.g., a releasability rule model) which may be used to guide redaction. At operation 550, the redaction template (e.g., rules model) along with the work product model are provided to redaction engine 58. The redaction engine returns the redacted image metadata, which may be combined with the redacted work product. At operation 560, the redacted image metadata may be sent to the WS-API, and at operation 470, the redacted image metadata may be returned to the user interface.

Figure 6:
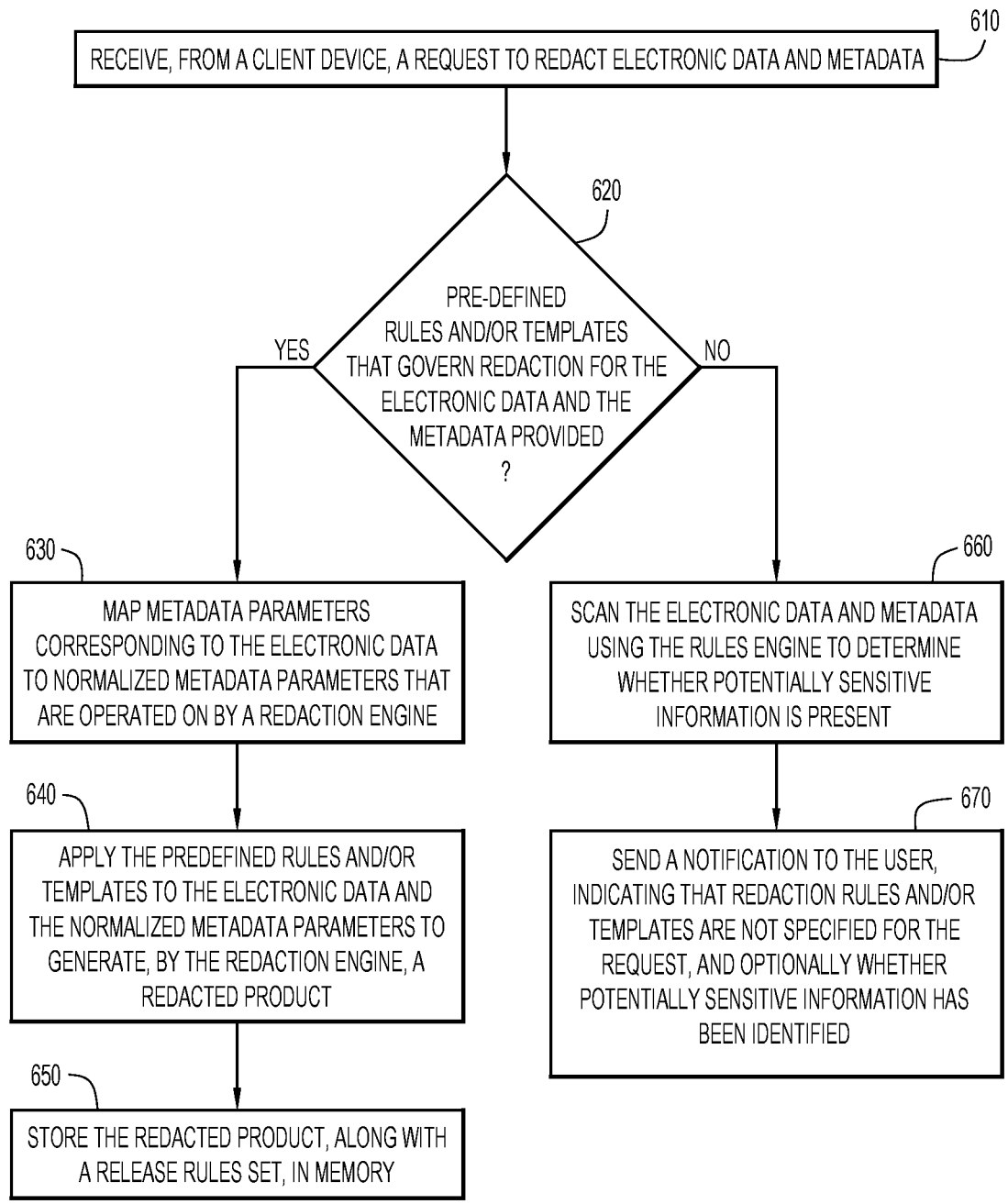
FIG. 6 is a flowchart showing example operations of a redaction and data releasability system, according to embodiments.

FIG. 6 is an operational flow chart comprising example operations according to the embodiments provided herein. At operation 610, a request is received from a client device to redact one or more source artifacts stored in electronic form and the metadata associated with the one or more source artifacts using pre-defined rules and/or templates that govern redaction of the electronic data and metadata by a redaction engine. In some aspects, a first set of rules may be used to redact data associated with the source artifacts and a second set of rules may be used to redact metadata associated with the source artifacts. In some cases, rules may be applied to specific types of source artifacts (e.g., a set of rules may be applied to images, another set of rules may be applied to text files, etc.). In some aspects, the request may be made by selecting one or more source artifacts from a list of source artifacts presented to the user by the system (e.g., using a document management system, enterprise management system, etc.). At operation 620, the system determines whether the pre-defined rules and/or templates that govern redaction for the electronic data and the metadata are provided. For example, a customer for which the redacted products are to be provided may be associated with a specific set of rules and/or templates. If the rules are/or templates are identified by the system, at operation 630, the system maps metadata parameters corresponding to the source artifacts to normalized metadata parameters that are recognized by the redaction engine. In some aspects, metadata parameters may be extracted from the source artifacts, as the metadata parameters may be present within a header of the source artifact. If the system is unable to perform the mapping, the system will attempt to infer an identity of the unmatched metadata parameter using the techniques provided herein. In the event that the unmatched metadata parameter cannot be identified and mapped to a normalized metadata parameter, the system will send a notification to the user. At operation 640, the predefined rules and/or templates are applied to the electronic data and the normalized metadata parameters to generate, by the redaction engine, a redacted product. In some aspects, the redacted product may be published, and saved in a database or file repository on a server at operation 650. In other aspects, the redacted product may be sent to an administrator for review prior to publication.

When pre-defined rules and/or templates are not identified by the system, at operation 660, the system, using the rules engine, may scan the electronic data and metadata using rules and/or templates that are specific to other customers in order to identify the presence of potentially sensitive information. For instance, the rules and/or templates used for redaction may provide a guide as to whether certain types of potentially sensitive information are present (e.g., names, locations, classified information, dates, etc.). At operation 670, a notification is provided to the user, indicating that customer-specific redaction rules and/or templates are not specified for the request. In some cases, the system may also indicate whether potentially sensitive information is present. Potentially sensitive information may include any type of information that the system has identified as sensitive in other contexts (e.g., for other recipients). Determination of whether the potentially sensitive information is sensitive information to be redacted may vary from recipient to recipient.

Advantages of the methods, systems and computer readable media disclosed herein include automation of redaction of data and metadata. Using a user-interface, a user can configure pre-defined rules and/or custom templates to perform redaction on data and metadata. Accordingly, redaction may be performed in an automated and consistent manner, with a reduced error rate as compared to manual redaction techniques performed by a user.

From the above, it will be appreciated that the embodiments provided herein solve a problem rooted in computer technology, namely redaction of electronic information (e.g., data and metadata). In particular, the issue of management of metadata only occurs in the computing domain. Unlike manual processes, the automated processes herein are specifically designed to manage electronic information. Electronic data, unlike paper documents, has associated metadata that is hidden and often difficult to locate, and may change as a function of time (e.g., as new application releases are available). For example, an image may have a hidden field that provides a location and date at which the image was acquired, as well as the device type, the author/user, links to other users, file path information showing the location of the file stored in memory, etc. Manual redaction processes of electronic information may not have access to or be aware of metadata, and thus, a user performing manual redaction may not redact all relevant information, which may lead to the accidental release of restricted information. As applications that generate electronic data undergo revisions and updates, the underlying metadata may change. The present techniques and systems may detect the metadata change and automatically resolve mapping of the modified metadata parameter. If unable to resolve the modified metadata parameter, the system may alert the user.

The embodiments provided herein are an improvement over current techniques in which a user manually performs redaction of electronic documents. The redaction processes, which are governed by rules and/or templates, consistently and accurately redact data and metadata with reduced error rates as compared to manual redaction processes. Additionally, the systems and techniques provide an improvement in computing performance, as the redacted work product may be produced in an efficient manner, with a reduced file size as compared to corresponding source artifacts. Accordingly, the present methods and systems may redact large corpuses of data with improved processing capabilities while reducing storage.

The techniques provided herein may be used as part of a workflow to produce different levels of redacted information to different groups in a reliable manner with a low error rate. In some aspects, sets of predefined rules and/or custom templates may be associated with particular redaction workflows, thereby producing redacted products according to different guidelines for different end users. Additionally, the system may be configured to generate an audit log to track changes in pre-defined rules and/or templates, including the user requesting the change and the supervisor approving the change.

For example, a set of documents considered to be top secret may undergo different levels of redaction to produce different sets of redacted documents. A first version of the documents may be redacted according to a first set of rules and/or templates and may be suitable for release to a party not having a security clearance, while a second version of the same documents may be redacted according to a second set of rules and/or templates and may be suitable for release to a party having a security clearance.

In some aspects, the embodiments provided herein may utilize machine learning techniques to perform object recognition associated with images. For example, an image may contain an object (e.g., a person's face, a building, a device, or other objects, etc.) located in the image to be redacted. In such cases, a machine learning approach may be used to identify the objects in the images, and target these objects for redaction. In some cases, the program may automatically redact the object upon identification.

The above embodiments are not limited to the specific tasks or algorithms described above, but may include any process for redacting metadata and data in an automated manner, based on pre-defined rule sets and/or templates in which modification of rules and/or templates may be performed without modification of the underlying source code. Additionally, the present techniques may be applied to text, image, or video data and corresponding metadata. In cases in which audio data is to be redacted, the audio file may be converted to a text file, and redacted according to the predefined rules and/or templates as provided herein.

The computer readable program instructions may be executed on a computer or other computing device to cause a series of operational steps to be performed by the computer or other computing device, resulting in a computer implemented process that produces the desired result (e.g., redacted data and work products, templates, rules, etc.).

The software as presented herein (e.g., modules including redaction module 50, host application 55, service gateway 70, etc.) may be provided on a non-transitory computer readable medium (e.g., CD-ROM, DVD floppy diskettes, magnetic and/or optical mediums, memory devices such as USB keys or external hard drives, etc.) for use with the systems (or stand-alone systems) as described herein.

A computer-readable medium may include any number of persistent storage devices (e.g., magnetic disk drives, solid state storage, etc.) and/or transient memory devices (e.g., RAM). Computer readable storage medium include but are not limited to a portable compact disc read-only memory (CD-ROM), a portable computer diskette or floppy disk, a digital versatile disk (DVD), an erasable programmable read-only memory (EPROM or Flash memory), a hard disk, a memory stick, a random access memory (RAM), a read-only memory (ROM), a static random access memory (SRAM), etc., as well as any suitable combination of the foregoing. The computer readable code is stored on a non-transitory medium.

A computer readable program may be translated into instructions for performing operations according to the techniques set forth herein, including but not limited to: assembler instructions, configuration data for integrated circuitry, firmware instructions, instruction-set-architecture (ISA) instructions, machine instructions, machine dependent instructions, microcode, state-setting data, or either source code or object code written in any combination of one or more programming languages, including an object oriented programming languages, and procedural programming languages, such as the "C" programming language or similar programming languages, languages for performing natural language processing, etc. Computer readable program code or instructions, stored on the computer-readable storage medium, is configured such that, when executed by a processor, the code or instructions causes the processing system to perform steps described above.

In other embodiments, the server or any one or more of the modules of server system 20 may be configured to perform the functions described above without the need for computer readable program code. For example, redaction module 50, host application 55, service gateway 70 (or any other suitable module) may comprise specialized hardware, such as one or more application-specific integrated circuits (ASICs). Hence, the features of the present invention described above may be implemented in hardware and/or software. For example, in some embodiments, the functional tiers described above may be implemented by executing computer instructions, by hardware independent of any computer instructions, or by any suitable combination of hardware and/or software.

The techniques presented herein may be applied to any desired type of computing environment (e.g., client-server, cloud-based computing, distributed computing, mainframe, network computing, stand-alone systems, etc.), and may be implemented by any number of any computing devices, including but not limited to desktops, servers, laptops, PDA, mobile devices, tablets, mainframes, etc.

The software corresponding to the techniques presented herein may be implemented in any suitable language, and may be developed by one of ordinary skill in the art, based upon the functional descriptions in the flowcharts and embodiments as set forth herein. Moreover, the software and/or algorithms as described herein are not limited to any particular order of operations, as set forth in the examples, but may include any order that accomplishes the functions as set forth herein. For example, two operations shown sequentially may, in fact, be executed substantially concurrently, or the operations may be executed in the reverse order, provided that the functionality for which the operations are designed in maintained.

While various embodiments and implementations of the present invention are described above and claimed, it should be understood that they have been presented by way of example only, and not limitation. For example, the data redaction and releasability system 100 may generate one or some or all of the redacted products described herein. Many modifications and variations will be apparent to those of ordinary skill in the art without departing from the scope and spirit of the invention. The embodiments illustrated herein were chosen in order to best explain the principles of operation and of practical applications. Thus, the breadth and scope of the present invention should not be limited by any of the above-described exemplary embodiments.

What is claimed is:

1. A computer implemented method of automating redaction of data and metadata of source artifacts in electronic format comprising:
receiving, from a client device, a request to redact data and metadata of source artifacts based on pre-defined rules and/or templates that govern redaction of the data and the metadata;
extracting metadata parameters from the source artifacts using a language parser, and mapping the extracted metadata parameters to normalized metadata parameters that are operated on by the redaction engine, wherein extracted metadata parameters of a same parameter type are mapped to a same normalized metadata parameter; and applying the predefined rules and/or the templates to the source artifacts to generate, by the redaction engine, a redacted product.

2. The method of claim 1, further comprising:

determining at least one metadata parameter has been modified, when the metadata parameter is not mapped to a corresponding normalized metadata parameter; and inferring an identity of the modified metadata parameter, and automatically mapping the modified metadata parameter to the corresponding normalized metadata parameter.

3. The method of claim 2, further comprising:

inferring the identity of the modified metadata parameter based on similarity to an unmatched normalized parameter, an order of parameters in a header, or characteristics of a value of the modified metadata parameter.

4. The method of claim 3, further comprising:

providing a notification to a user when the identity of the modified metadata parameter is not inferred.

5. The method of claim 1, further comprising:

compressing the redacted product.

6. The method of claim 1, wherein the source artifacts comprise text, image, or video and corresponding metadata associated with the text, image, or video source artifacts.

7. The method of claim 1, wherein the redaction engine may be integrated into a host application configured to access the source artifacts.

8. The method of claim 1, further comprising:

adding new metadata or new data to the redacted product according to a data addition rule.

9. The method of claim 1, further comprising:

receiving a command to change a pre-defined rule or a template; and updating the pre-defined rule or the template without modifying underlying source code of the redaction engine.

10. The method of claim 9, further comprising:

sending a notification to an administrator to approve or deny the command.

11. The method of claim 1, wherein sets of predefined rules and templates are associated with redaction processes to create redacted products for specific users.

12. A system for automating redaction of data and metadata of source artifacts in electronic format comprising one or more processors configured to:

receive, from a client device, a request to redact data and metadata of source artifacts based on pre-defined rules and/or templates that govern redaction of the data and the metadata;

extract metadata parameters from the source artifacts using a language parser, and map the extracted metadata parameters to normalized metadata parameters that are operated on by the redaction engine, wherein extracted metadata parameters of a same parameter type are mapped to a same normalized metadata parameter; and apply the predefined rules and/or the templates to the source artifacts to generate, by the redaction engine, a redacted product.

13. The system of claim 12, wherein the one or more processors are further configured to:

determine that at least one metadata parameter has been modified, when the metadata parameter is not mapped to a corresponding normalized metadata parameter; and infer an identity of the modified metadata parameter, and automatically map the modified metadata parameter to the corresponding normalized metadata parameter.

14. The system of claim 13, wherein the one or more processors are further configured to:

infer the identity of the modified metadata parameter based on similarity to an unmatched normalized parameter, an order of parameters in a header, or characteristics of a value of the modified metadata parameter.

15. The system of claim 14, wherein the one or more processors are further configured to:

provide a notification to a user when the identity of the modified metadata parameter is not inferred.

16. The system of claim 12, wherein the one or more processors are further configured to:

compress the redacted product.

17. The system of claim 12, wherein the source artifacts comprise text, image, or video and corresponding metadata associated with the text, image, or video source artifacts.

18. The system of claim 12, wherein the redaction engine may be integrated into a host application configured to access the source artifacts.

19. The system of claim 12, wherein the one or more processors are further configured to:

add new metadata or new data to the redacted product according to a data addition rule.

20. The system of claim 12, wherein the one or more processors are further configured to:

receive a command to change a pre-defined rule or a template; and update the pre-defined rule or the template without modifying underlying source code of the redaction engine.

21. The system of claim 20, wherein the one or more processors are further configured to:

send a notification to an administrator to approve or deny the command.

22. The system of claim 12, wherein sets of predefined rules and templates are associated with redaction processes to create redacted products for specific users.

23. A computer program product for automating redaction of data and metadata of source artifacts in electronic format, the computer program product comprising a computer readable storage medium having program instructions embodied therewith, the program instructions executable by one or more processors to:

receive, from a client device, a request to redact data and metadata of source artifacts based on pre-defined rules and/or templates that govern redaction of the data and the metadata;

extract metadata parameters from the source artifacts using a language parser, and map the extracted metadata parameters to normalized metadata parameters that are operated on by the redaction engine, wherein extracted metadata parameters of a same parameter type are mapped to a same normalized metadata parameter; and apply the predefined rules and/or the templates to the source artifacts to generate, by the redaction engine, a redacted product.

* * * * *